Nov. 25, 1947.   E. PISARELLI   2,431,343
BROACHING TOOL
Filed March 23, 1945   2 Sheets-Sheet 1

INVENTOR.
Edward Pisarelli
BY
Ralph L. Chappell
ATTORNEY

Nov. 25, 1947.    E. PISARELLI    2,431,343
BROACHING TOOL
Filed March 23, 1945    2 Sheets-Sheet 2

INVENTOR.
Edward Pisarelli
BY
Ralph L. Chappell
ATTORNEY

Patented Nov. 25, 1947

2,431,343

UNITED STATES PATENT OFFICE 2,431,343

BROACHING TOOL

Edward Pisarelli, New York, N. Y.

Application March 23, 1945, Serial No. 584,476

5 Claims. (Cl. 90—33)

(Granted under the act of March 3, 1883, as amended April 30, 1928; 370 O. G. 757)

This invention relates to a machine for performing certain tooling operations upon a piece of work by means of a reciprocating movement of the tool relative to the work, and more particularly concerns the mechanism for holding the work and tool so that they will be properly positioned relative to each other about the axis of reciprocation.

In certain precision machining operations such as broaching it is customary to hold the work stationary and reciprocate the tool relative to the work. Thus if it is desired to cut, for example, a diamond shaped opening in a piece of stock, the stock customarily is held in a stationary position and the broaching tool having diamond-shaped cutting edges is reciprocated through the work.

Difficulty is often encountered when performing such operations in ensuring that the tool and work are correctly positioned relative to each other about the axis of reciprocation. For example, in making a cut having a diamond shape, it frequently occurs that the tool may inadvertently be rotated slightly about the axis of reciprocation before being secured, thereby producing a cut in the stock which is of the desired shape and having its center correctly spotted on the stock, but rotated slightly about the axis of reciprocation so that the points of the diamond cut are positioned slightly clockwise or counterclockwise from the desired position. To insure an accurate cut it has heretofore been necessary by trial and error on samples of work to ascertain the correct positioning of the tool and work and this necessitates wasting of samples as well as loss of time.

It also occurs in operations such as broaching that when it is desired to perform the same operation upon a series of similar pieces it is necessary to make a new and individual adjustment of the tool and work for every piece to be broached. This involves a loss of time and inordinately slows the operations.

The present invention overcomes these difficulties by providing means for positioning and securing the work and tool which are adjustable and which are calibrated to indicate the position of angular rotation of both work and tool about the axis of reciprocation. By properly positioning the work relative to the calibration marks in its holder and by properly positioning the tool relative to the calibration marks on its holder, it is ensured that the work and tool are properly positioned relative to each other.

Particularly the invention achieves the improved result by providing a holder for the work which has calibration marks indicating the angular position of rotation about the axis of reciprocation so that the work can be secured in any desired angular position, in combination with a holder for the tool in which the tool may be secured at any random position which can be determined by measuring with suitable instruments, and calibrated means which can be adjusted to rotate the tool from random position into an angular position of rotation about the axis of reciprocation which corresponds to the previously fixed position of the work.

An object is to provide a machine of the type described in which the tool and work may be adjusted with precision relative to each other before testing operations are started whereby need for trial and error cutting operation on samples of work which must be discarded are eliminated.

A further object of the invention is to provide a machine of the type described in which the tool can be adjusted relative to any piece of work and cutting operations can then be made in a series of similar pieces of work without changing the adjustment of the tool.

A further object is to provide a machine for performing reciprocating machining operations upon a piece of work with a tool wherein means are provided for properly positioning the work and tool relative to each other about the axis of reciprocation.

A further object of the invention is to provide an apparatus for performing reciprocating machining operations upon a piece of work wherein the holder for the work is calibrated so that the work can be secured in any desired angular position of rotation about the axis of reciprocation, and the holder for the tool is adapted to secure the tool in any random position and by calibrated means rotate the tool from random position into final position whereby the angular position of rotation about the axis of reciprocation corresponds to the previously fixed position of the work.

Referring to the drawings.

Figure 1:
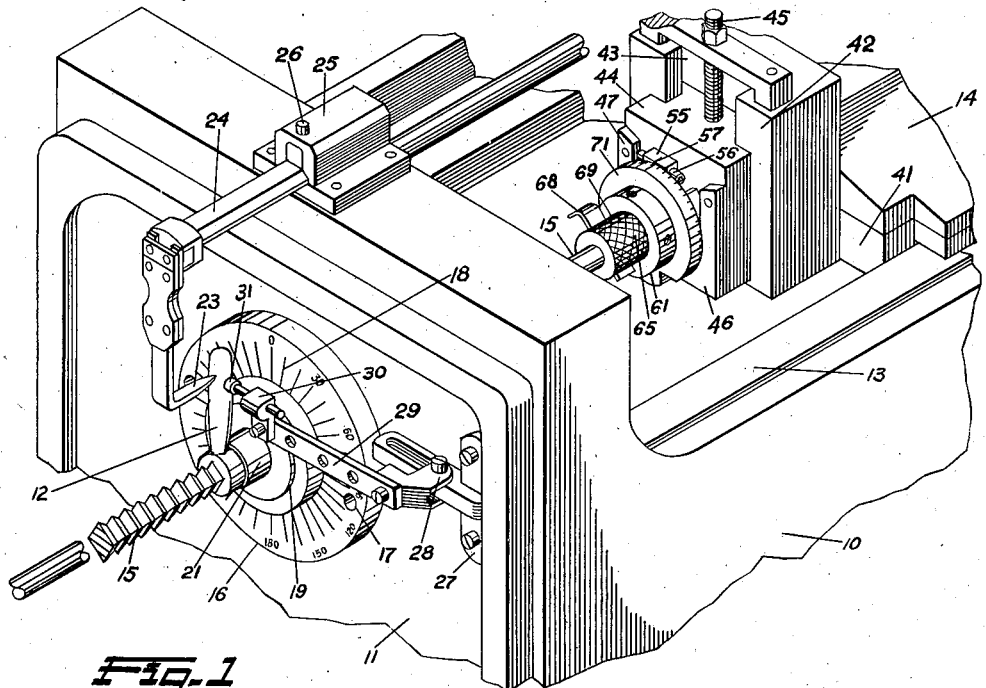
Figure 1 is a perspective view of a preferred form of the invention.

Referring to the drawings in detail, and with particular reference to Figure 1, there is shown for purposes of illustration a broaching machine having a frame 10 made of steel or other suitable material. Frame 10 includes a fixed head 11 disposed in a vertical position and adapted to accommodate an article 12, for example, a wrench to be broached, parallel guide tracks 13 which are horizontally arranged and integral with fixed head 11, and sliding head 14 which is adapted to accommodate a broaching tool 15 and to reciprocate upon tracks 13 toward and away from fixed head 11 whereby broaching tool 15 can reciprocate along an axis to perform a cutting operation upon work 12, which is illustrated as being a hand wrench in which it is desired to make a diamond shaped cut.

A disc-shaped faceplate 16 is bolted at 17 to the surface of fixed head 11 away from sliding head 14. Radial calibration marks 18 are scribed on the surface of faceplate 16 and for convenience the vertically extending mark is designated as a zero reference point with the other marks indicating angular degrees from 0° to 180° both clockwise and counterclockwise. A center bore 19 is provided in faceplate 16 and this is coaxial with a bore (not shown) extending through fixed head 11, whereby tool 15 may reciprocate completely through fixed head 11 and faceplate 16.

An adapter 21 is disposed in bore 19 in the axis of reciprocation of tool 15 and is provided with an axial bore (not shown) adapted to accommodate tool 15 during its reciprocating cutting stroke. Adapter 21 further serves to position work 12 relative to faceplate 16 to insure that the proper part of work 12 is in the axis of reciprocation of tool 15. By means of radial calibrations 18 on faceplate 16 it is possible to locate work 12 in any desired position of angular rotation about the axis of reciprocation of tool 15. In the drawings, work 12 is shown as being located in a vertical position in registration with the zero reference calibration on faceplate 16.

An index pointer 23 is mounted on fixed head 11 for registration with the zero calibration on faceplate 16 and serves to facilitate the location of work 12 with respect to calibrations 18. As shown in Figure 1, index pointer 23 is made adjustable on fixed head 11 by means of supporting arm 24 which is designed for sliding movement within bracket 25 bolted to fixed head 11. Set screw 26 locks arm 24 and pointer 23 in fixed position.

An assembly for retaining work 12 in proper position is shown as including a bracket 27 mounted on faceplate 16, a sliding arm 28 mounted on the bracket and serving as a support for pivoted arm 29. Retainer head 30 is pivoted on arm 29 and is provided with an adjustable work rest 31.

Figure 2:
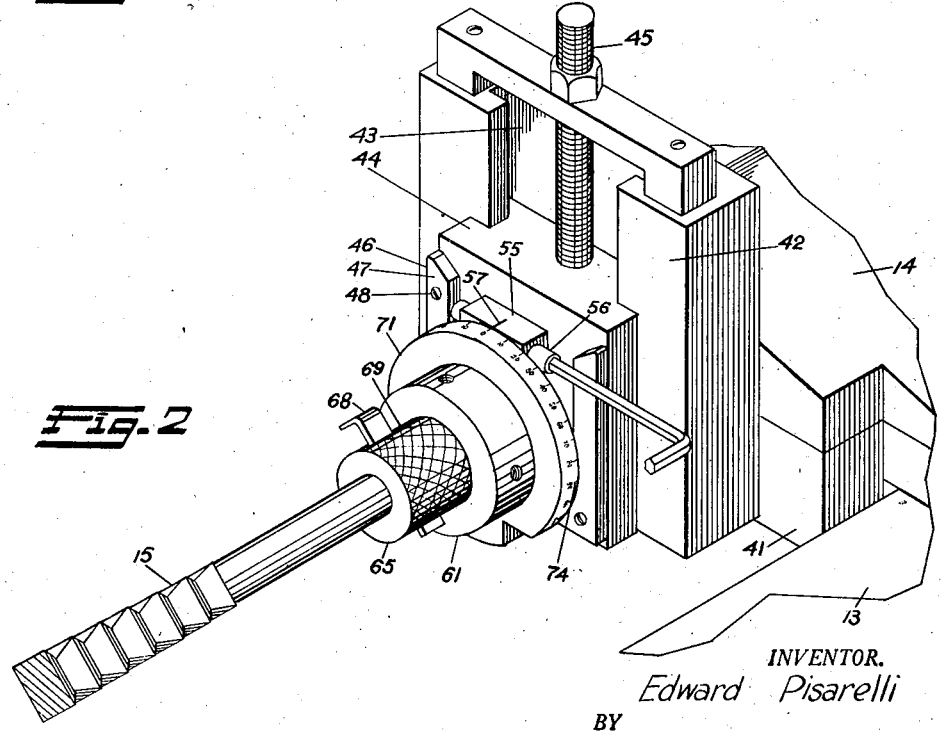
Figure 2 is a perspective view of the tool holding device forming a part of the invention.
Figure 3:
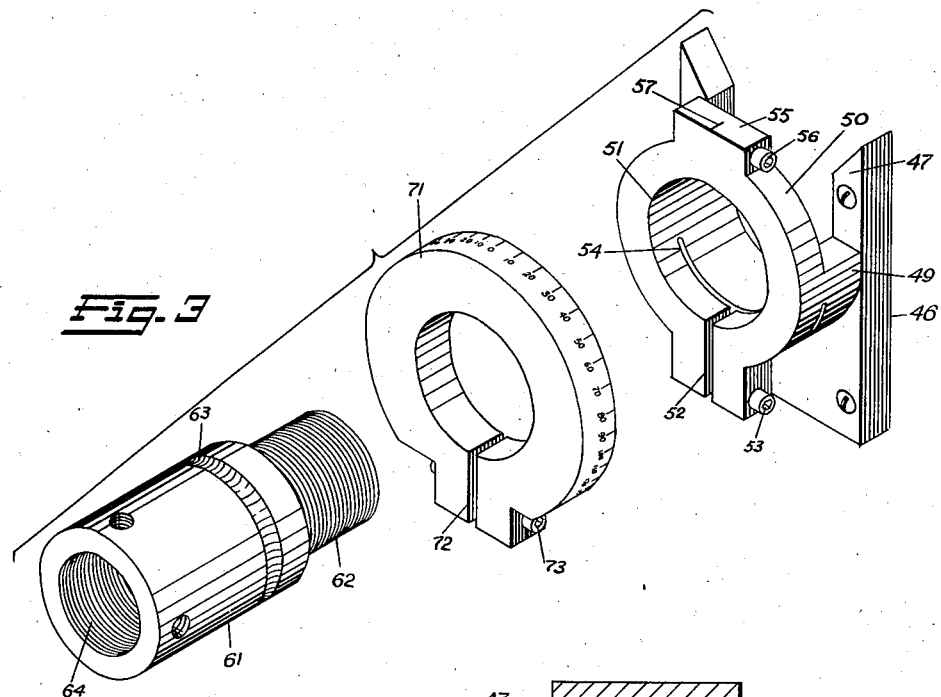
Figure 3 is an exploded view showing certain parts of the tool holding device.
Figure 4:
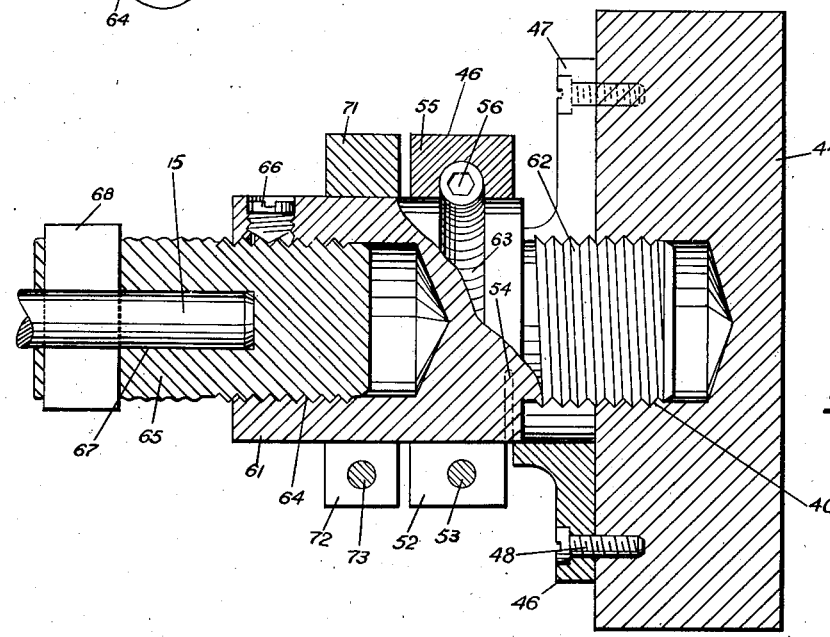
Figure 4 is a view in longitudinal section of the tool holding device.

Referring particularly to Figures 2, 3 and 4 it will be seen that sliding head 14 comprises an assembly including the sliding head block 41 adapted for reciprocation upon guide rails 13 toward and away from fixed head 11 of Fig. 1, vertical guide plate 42 rigidly secured to head block 41 and provided with a guide groove 43, and a positioning block 44 adapted by means of adjusting bolt 45 to be vertically adjustable in guide grooves 43. A threaded recess 40 is provided in block 44.

A tool stock 46 having a flange plate 47 is secured to positioning block 44 by bolts 48. An integral web 49 (Fig. 3) joins flange plate 47 to a collar 50 having a central bore 51. Collar 50 is split at 52 and provided with a locking screw 53 for tightening or loosening collar 50. A transverse slot 54 is provided in web 49 to increase the flexibility of split collar 50. The top of collar 50 is provided with a lug 55 that accommodates a worm drive 56 which may be manually rotated and which is exposed inside collar 50 to mesh with a worm track hereinafter described. The top of lug 55 is provided with an index mark 57 which is scribed thereon.

The zero calibration mark 18 scribed on faceplate 16 and index mark 57 which is scribed on collar 50 occupy identical positions relative to the axis of reciprocation of tool 15 in moving toward and away from fixed head 11, and as illustrated in the drawings both marks are positioned vertically above the line of reciprocation. It will therefore be seen that objects may be positioned relative to angle of rotation about the axis of reciprocation by reference to either calibration marks 18 or index mark 57. Thus in positioning work 12 and tool 15 relative to each other about the axis of reciprocation, position of work 12 may be determined with reference to calibration marks 18 and position of tool 15 may be determined with reference to index mark 57.

Cylindrical tool chuck 61 is adapted for accommodation in bore 51 of tool stock 46 and at its forward end is provided with a threaded stud 62 adapted for screwing into recess 40 in block 44. A circumferentially arranged worm track 63 is provided externally on chuck 61 for meshing with worm drive 56. The end of chuck 61 away from stud 62 is internally threaded at 64 to receive a threaded chuck adapter 65. Set screw 66 is arranged to lock adapter 65 within chuck 61. Adapter 65 is provided with an internal bore 67 to receive one end of tool 15 and a pin 68 is provided for locking tool 15 within adapter 65. A knurled surface 69 is provided on adapter 65.

A collar 71 is mounted on chuck 61 adjacent tool stock collar 50, and is split at 72 so that it may freely rotate about chuck 61. Locking bolt 73 is adapted to tighten collar 71 so that it becomes clamped against rotation on chuck 61. Calibration marks 74 are provided externally on the collar, and may be graduated both clockwise and counterclockwise from an index marking of zero to a marking of 180°.

Operation of the machine is as follows. When the machine is not tooled for operation, reciprocating head 14 will be adjusted in the following manner. Tool stock 46 is bolted to positioning block 44 and tool chuck 61 is threaded into block 44 and mounted in split collar 50 in such manner that worm drive 56 meshes with worm track 63 whereby rotation of tool chuck 61 may be effected by rotation of worm drive 56. Calibrated collar 71 is loosely mounted upon tool chuck 61 and may be freely rotated thereon. Chuck adapter 65 is loosely screwed into chuck 61 and set screw 66 is not in engaged position.

The machine may be tooled up for a broaching operation upon wrench 12 as follows. Wrench 12 is placed in abutment with adapter 21 of faceplate 16, and with the pre-drilled bore of wrench 12 in axial alignment with the bore in adapter 21. Wrench 12 is then rotated into any desired position relative to calibration marks 18. In Figure 1, wrench 12 is shown in registration with the zero calibration. Wrench 12 is retained in this position by adjusting retainer head 30 so that the shaft of wrench 12 rests against work rest 31. In this manner the exact position of the work relative to angle of rotation about the axis of reciprocation of the machine is fixed.

The narrow end of broaching tool 15 is then passed through the bore in wrench 12 and adapter 21 of fixed head 11 to reciprocating head 14 and locked in bore 67 of tool chuck adapter 65 by means of pin 68. Positioning block 44 may be vertically adjusted, as required, by means of bolt 45. Chuck adapter 65 with tool 15 are then rotated into any random position, for example, with the flat of the broach cutting edges horizontal as may be determined by use of a bubble level, and set screw 66 is then tightened to lock chuck 61 and adapter 65 together. Calibrated collar 71 is then locked by means of lock bolt 73 to tool chuck 61 with the zero calibration in the collar in registration with index mark 57 scribed on boss 55 of tool stock 46. Tool chuck 61 may then be rotated by means of worm drive 56 the required number of degrees, as indicated by the calibration in collar 71 to bring tool 15 into the angular position of rotation about the axis of reciprocation necessary for tooling wrench 12. Tool chuck 61 may be locked in this position by tightening lock bolt 53.

The broaching operation is then performed by causing reciprocation of head 14 away from fixed head 11 whereby broaching tool 15 is drawn through wrench 12 to produce the desired cut therein.

It will be seen from the above description that once the position of work 12 and tool 15 are determined, it is possible to perform the same operation upon a series of such pieces of work without making any further adjustments.

It will further be seen that the initial positioning of work 12 and tool 15 can be made with precision by means of calibrated faceplate 16 and calibrated collar 71 without the necessity of trial and error operations on sample pieces of work and consequent wasting of stock.

It is to be understood that various modifications and changes may be made in this invention without departing from the spirit and scope thereof as set forth in the appended claims.

The invention described herein may be manufactured and used by or for the Government of the United States of America for governmental purposes without the payment of any royalties thereon or therefor.

What is claimed is:

1. A machine comprising a work support and a tool support adapted for moving a tool along a cutting axis of reciprocation relative to the work, and separate means on said work support and said tool support whereby the position of a tool on said tool support and the position of a piece of work on said work support may be independently determined and regulated relative to each other and relative to angular position about said cutting axis of reciprocation, said separate means being calibrated from a common reference on the machine.

2. A machine comprising a frame, a fixed head integral with said frame, a sliding head adapted to reciprocate on said frame along an axis relative to said fixed head, calibration marks in said fixed head, means for positioning a piece of work adjacent said fixed head in the line of reciprocation of said sliding head whereby the position of the work relative to rotation about said axis of reciprocation is determined, a chuck for holding a tool and adapted for mounting in random position on said sliding head, calibration marks on said sliding head for indicating the random position of said chuck relative to rotation about the axis of reciprocation of said sliding head and relative to the piece of work, and means for rotating said chuck into cutting position relative to rotation about the axis of reciprocation which is predetermined by the position of the piece of work to be tooled, said calibration marks on said fixed head and said sliding head having a common reference on the machine.

3. A machine comprising a frame, a fixed head integral with said frame, a reciprocating head adapted to reciprocate on said frame along an axis relative to said fixed head, means adapted for retaining a piece of work adjacent to said fixed head, means associated with said head for indicating the position of the piece of work relative to rotation about said axis of reciprocation, means associated with said reciprocating head for retaining a tool in position, means for mounting a tool in random position on said reciprocating head, means for indicating the random position of the tool relative to the piece of work and relative to rotation about said axis of reciprocation, and means for rotating said tool from random position into predetermined cutting position relative to the work and axis of reciprocation.

4. A machine comprising a frame, a fixed head integral with said frame, a reciprocating head adapted to reciprocate on said frame along an axis relative to said fixed head, means on said fixed head for positioning a piece of work in said axis of reciprocation, means in said fixed head for indicating the angular position of a piece of work about said axis, a tool holder on said reciprocating head, means for securing a tool in said holder in random position, means in said reciprocating head for indicating the random angular position of a tool about said axis, means on said reciprocating head for indicating the final angular cutting position corresponding to the angular position of a piece of work, and means for rotating said tool holder from random position to said final cutting position.

5. A machine comprising a frame, a fixed head integral with said frame, a reciprocating head adapted to reciprocate on said frame relative to said fixed head, a faceplate mounted on said fixed head in the axis of reciprocation of said reciprocating head, said faceplate having calibration marks indicating radial position relative to said axis of reciprocation, means for positioning a piece of work adjacent said faceplate in said axis of reciprocation and in registration with said calibration marks whereby its radial position relative to said axis of reciprocation is determined, means for maintaining said work in position, a tool stock integral with said reciprocating head and including a split collar aligned with said axis of reciprocation, a tool chuck mounted for rotation within said collar about said axis of reciprocation, a worm drive in said stock adapted for meshing with a worm track on said chuck to cause rotation of said chuck about said axis of reciprocation, means for tightening said split collar on said stock whereby said worm drive is locked relative to said worm track so that said chuck is locked against rotation in said stock, a split collar mounted on said chuck, means for regulating the tightness of said collar on said chuck whereby said collar when tightened is locked integrally to said chuck and whereby said collar when loosened is adapted to rotate freely about said chuck, calibration marks on said collar indicating radial position about said axis of reciprocation, an index on said stock for registration with said collar calibration marks, said stock index and said fixed head calibration marks having a common reference on the machine, said chuck having a tool locked therein, said chuck with said tool locked therein being positioned in said stock with said chuck collar loosened, said chuck being in random radial position relative to said axis of reciprocation, whereby said chuck may be rotated through an angle about said axis of reciprocation from random position to predetermined cutting position with said chuck collar tightened, said angle being indicated by registration of said stock index with said chuck collar calibrations, and whereby said split stock collar may be tightened to lock said chuck against rotation relative thereto.

EDWARD PISARELLI.

REFERENCES CITED

The following references are of record in the file of this patent:

UNITED STATES PATENTS

| Number | Name | Date |
| --- | --- | --- |
| 1,233,373 | Lapointe | July 17, 1917 |
| 1,380,945 | Brown | June 7, 1921 |
| 2,324,476 | Becker | July 20, 1943 |